United States Patent [19]
Chang

[11] Patent Number: 5,630,241
[45] Date of Patent: May 20, 1997

[54] COMBINATION PLIERS

[76] Inventor: Leonard Chang, 4F, No. 5, Lane 130, Min-Chung Rd., Hsin-Tian City, Taipei Hsien, Taiwan

[21] Appl. No.: 638,714

[22] Filed: Apr. 29, 1996

[51] Int. Cl.⁶ .................................................. B25F 1/00
[52] U.S. Cl. ........................... 7/107; 7/129; 81/9.44
[58] Field of Search .......................... 7/107, 129; 81/9.4, 81/9.44; 30/90.1

[56] References Cited

U.S. PATENT DOCUMENTS

| | | |
|---|---|---|
| 3,827,317 | 8/1974 | Perrino ........................................ 7/107 X |
| 4,571,764 | 2/1986 | Chen et al. .................................. 7/107 |
| 4,835,862 | 6/1989 | Phillips ....................................... 7/107 X |
| 5,435,029 | 7/1995 | Carlson et al. .............................. 7/107 |

*Primary Examiner*—James G. Smith
*Attorney, Agent, or Firm*—Beveridge, DeGrandi, Weilacher & Young LLP

[57] ABSTRACT

A combination pliers structure for cutting and skinning wires including a press handle mechanism having an elbow means for controlling an inner jaw means and an outer jaw means. The outer jaw means in located adjacent to the inner jaw means. In use, the press handle mechanism is suitably pressed so that a cutter at a front end of the inner jaw means cuts into the skin of the wire while the outer jaw means clamps the wire. When a greater force is exerted on the press handle mechanism, the outer jaw means is brought by the elbow portion pivotally joined to the press handles to advance forwardly along the wire, while the cutter strips the skin off the wire without damaging the wire filaments inside.

1 Claim, 6 Drawing Sheets

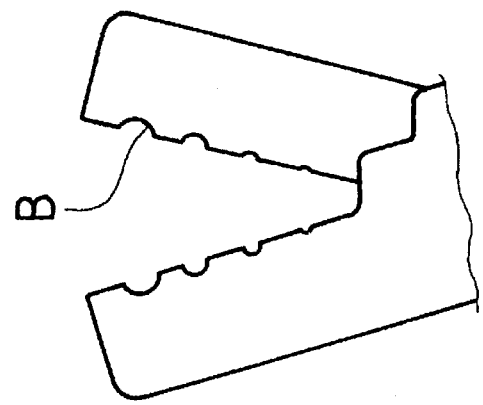
FIG. 1 (B) Prior Art
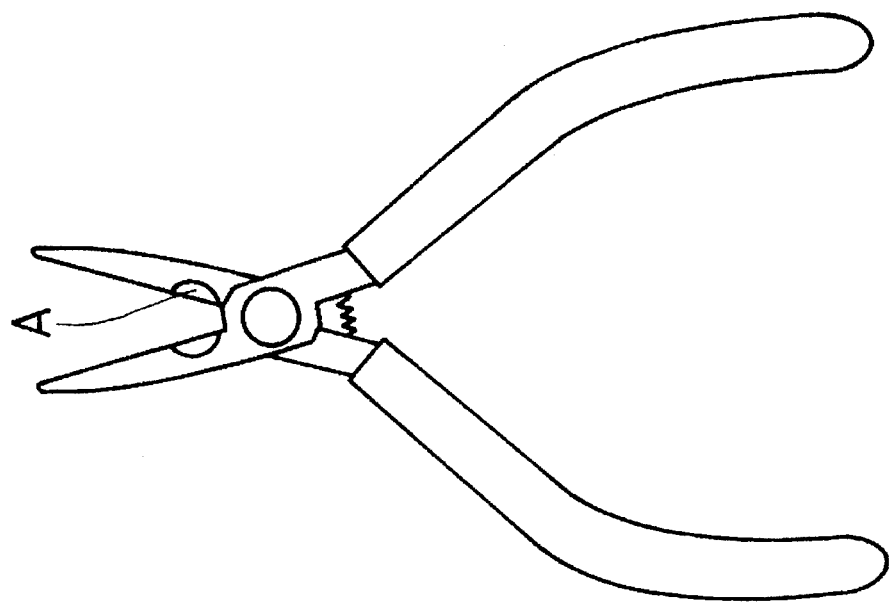
FIG. 1 (A) Prior Art

COMBINATION PLIERS

BACKGROUND OF THE INVENTION

1. Field of the Invention

The present invention relates generally to pliers, and more particularly to combination pliers capable of cutting and stripping wires without damaging the wire filaments.

2. Description of the Prior Art

There are various known manners of stripping wire skin which may be summed up as follows:

1. The wire skin is melted by burning. This method is only applicable for contingent cases and wires of smaller diameter (e.g., 1 mm). For skinning large amounts of wires of wires of larger diameters, tools will be needed.
2. Using conventional pliers (as shown in FIG. 1a) to cut into the wire by means of a cutting portion A. However, it depends largely on the expertise of the user to determine how much force should be exerted. An inexperienced user may cut the wire filaments during wire skinning.
3. There is also available on the market another type of pliers (as shown in FIG. 1B It is provided with a plurality of jaw holes B having different diameters. Although it provides the user with the facility of cutting wires of different diameters, there is still the problem of using the pliers in wire skinning. Besides, wire cutting and skinning have to be done separately, and it also depends on the experience of the user to determine the suitable amount of force to be exerted.

It can therefore be seen that in the prior art wire cutting and skinning have to be done in two separate operations and that the pliers are oriented vertically to the wire during wire skinning, which is less efficient.

SUMMARY OF THE INVENTION

Accordingly, a primary object of the present invention is to provide a combination pliers structure in which the pliers are moved in a linear direction along the wire to achieve maximum wire skinning effects and wire filaments can be prevented from damage during wire skinning.

BRIEF DESCRIPTION OF THE DRAWINGS

The foregoing and other features and advantages of the present invention will be more clearly understood from the following detailed description and the accompanying drawings, in which, FIG. 1A is a schematic view of a conventional structure of pliers;

FIG. 1B is a schematic view of another conventional structure of pliers;

DETAILED DESCRIPTION OF THE PREFERRED EMBODIMENT

Figure 2:
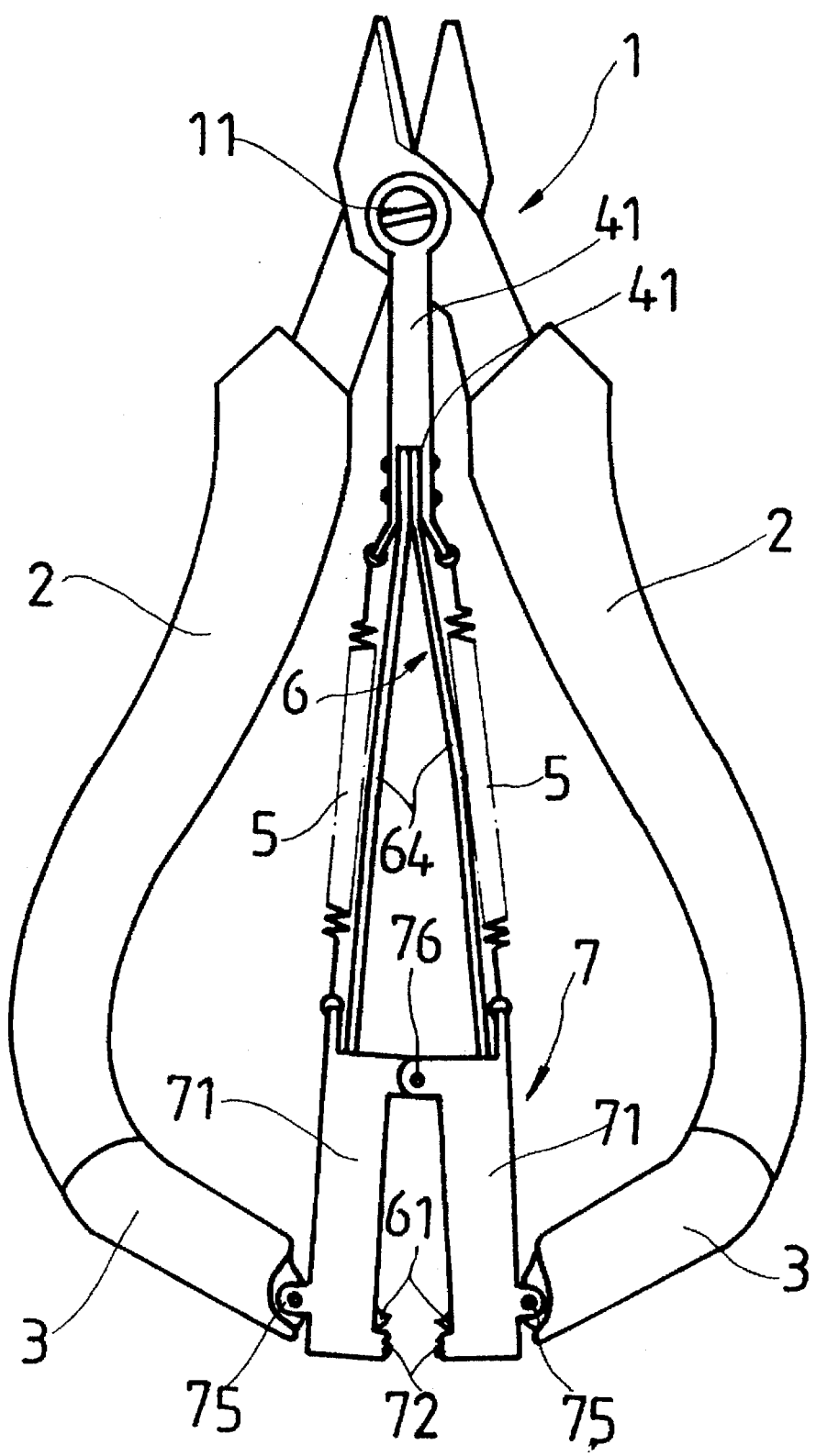
FIG. 2 is a schematic view of the combination pliers of the present invention.

With reference to FIG. 2, a preferred embodiment of the combination pliers according to the present invention essentially comprises a pliers body 1 utilizing that utilizes a press handle mechanism to control a wire cutter at a front end thereof and a end portion for controlling a skinning mechanism, a pair of press handles 2, a positioning lever 4, a spring 5, an inner jaw means 6, and an outer jaw means 7. Force is exerted on the press handles 2 using a pivot 11 as the center of the pliers body 1. The positioning lever 4 is pivotally connected to the pivot 11 and extends downwardly therefrom. The positioning lever 4 is used to clamp a rear end of the inner jaw means 6 of the skinning mechanism and, via the spring, control the action of the outer jaw means 7 adjacent to the inner jaw means 6. The outer jaw means 7 is used for clamping wires while the inner jaw means is used for cutting purposes. The inner jaw means 6 is used to cut into the skin of the wire, and by means of the reverse sliding displacement of the inner jaw means 6 and the outer jaw means 7, the cut wire may be quickly skinned.

The inner jaw means 6 of the skinning mechanism consists of two elongate strips 64 which extend outwardly with respect to each other to a suitable degree. Both strips 64 have their front ends located and positioned at a slot 41 of the positioning lever 4 and their rear ends opening outwardly and bending inwardly to form L-shaped portions that face each other at their extreme rear ends. The extreme rear end portions of the strips 64 form a pointed cutter 61 having a suitable sharpness for cutting into the skin of wires without cutting off wire filaments therein.

Figure 3:
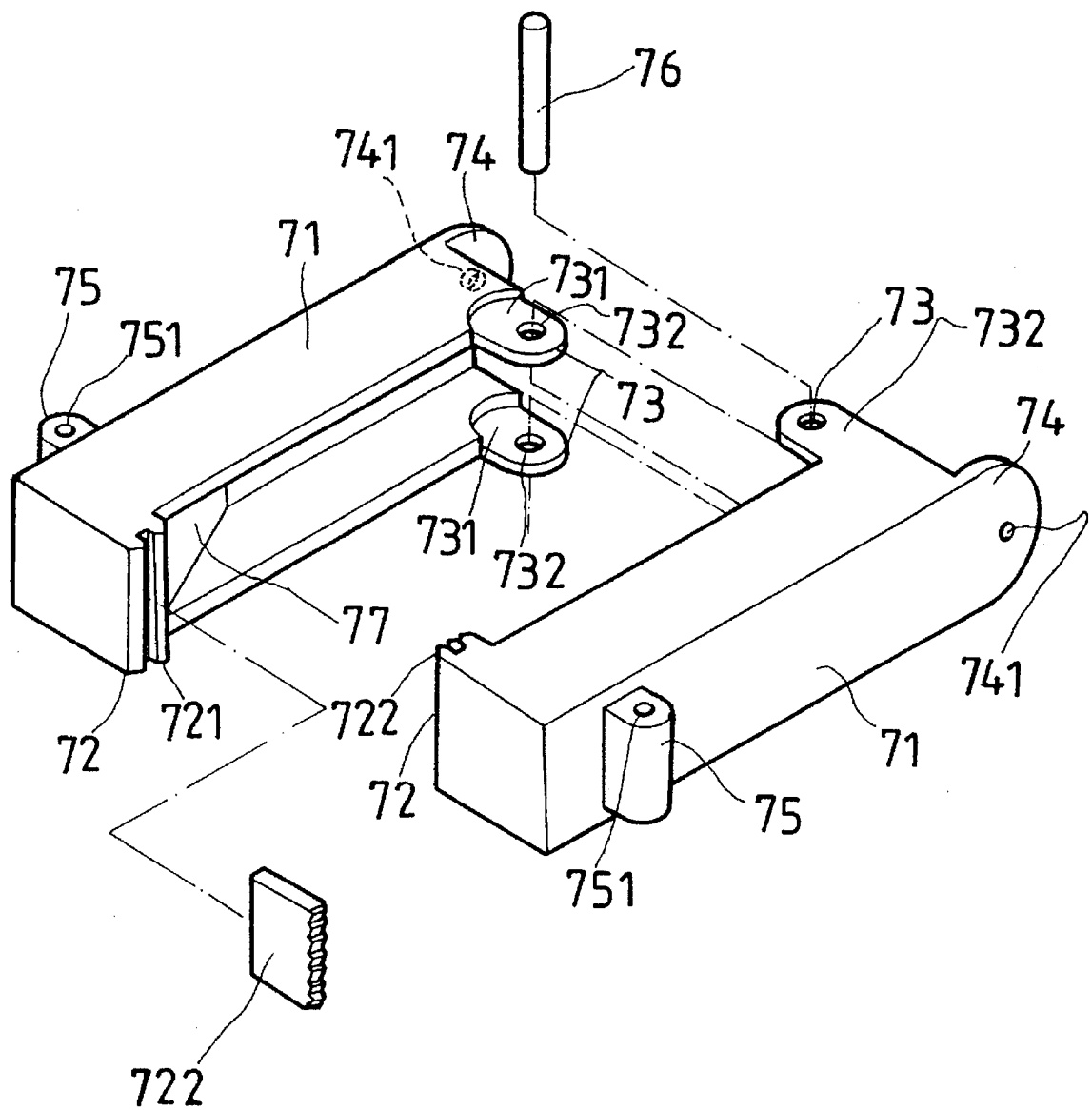
FIG. 3 is a schematic view of an outer jaw means of the combination pliers of the present invention.

With reference to FIGS. 2 and 3, the outer jaw means 7 consists of two pivotally connected jaw portions 71 integrally formed from reinforced plastic material. One end of each jaw portion 71 forms a pivot portion with a lug 73 with a through hole 732. One of the jaw portions 71 is further provided with a depressed portion 731 forming the lug 73 with the through hole 732. A tail portion 74 having a hole 741 extends from the end of the jaw portion 71 adjacent the lug 73. The other end of each jaw portion 71 forms a clamping portion 72 provided with a groove 721. A metal sheet 722 may be inserted between the clamping portions 72 of the outer jaw means 7. An inclined surface 77 is formed at an inner side of each jaw portion 71 adjacent the clamping portion 72 such that the jaw portion 71 gradually decreases in thickness from the clamping portion 72 to a certain extent before extending towards the pivot portion. A mounting lug 75 with a hole 751 is disposed at an outer side of each clamping portion 72. The outer jaw means 7 is arranged at the outer side of the inner jaw means 6 and is secured with the positioning lever 4 by means of the spring 5. A pin 76 is used to pass through the through holes 732 of the lugs 73 to join the jaw portions 71 pivotally together.

Figure 4:
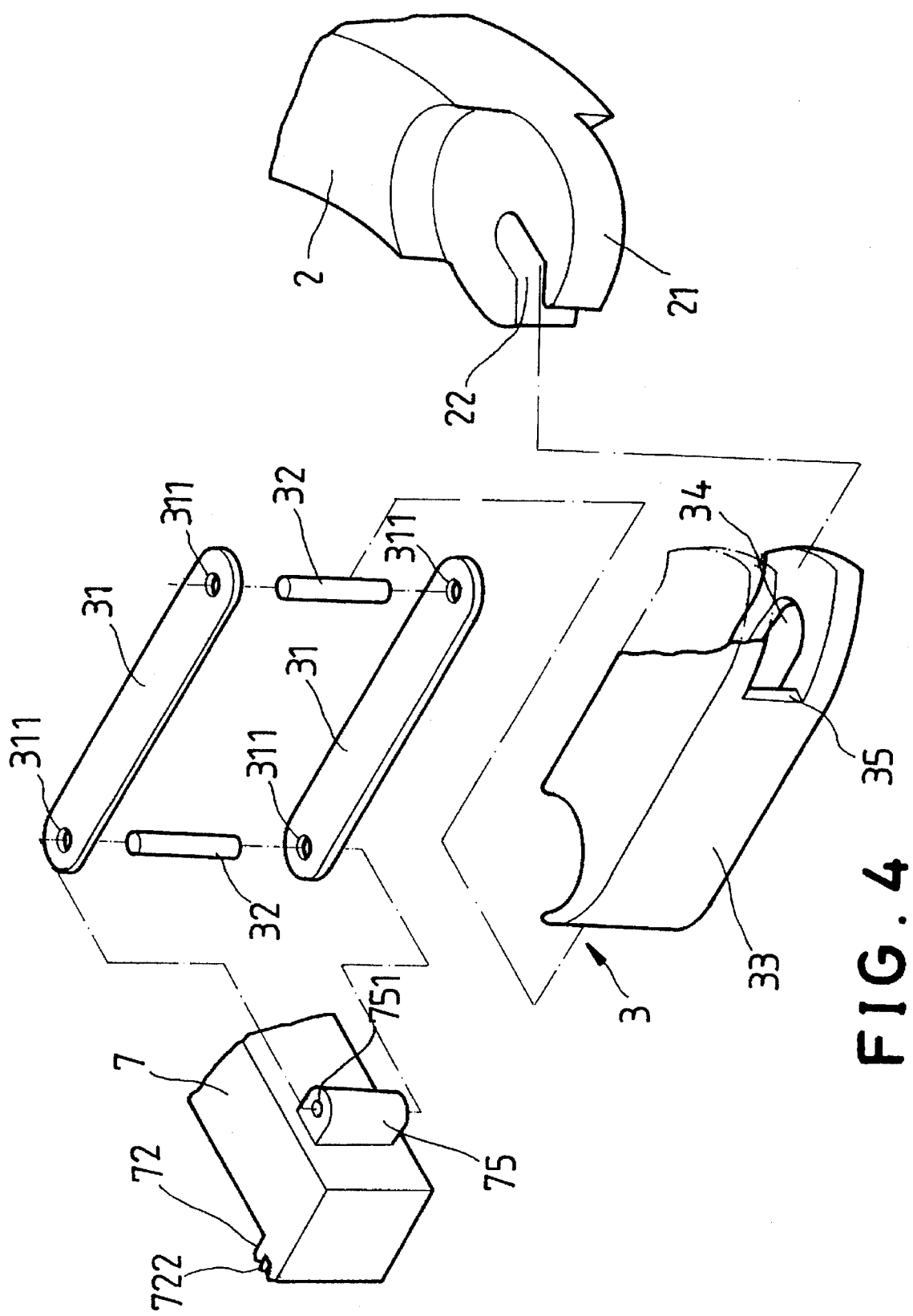
FIG. 4 is an exploded view of an elbow portion of the combination pliers of the present invention.

The press handle mechanism consists of the pair of press handles 2 and a pair of elbow portions 3. With Reference to FIG. 4, each press handle 2 is provided with a projecting portion 21 with a notch 22 for receiving the elbow portion 3. Each elbow portion 3 consists of two links 31, a couple of pins 32 and an outer covering 33. Each link 31 has a hole 311 at either end thereof. The pins 32 are used to join one end of the links 31 to the mounting lug 75 of the outer jaw means 7 and position the other end of the links 31 at the notch 22 of the press handle 2. The outer covering 33 is internally provided with a slot 34 shaped to match the links 31 at an upper side and a lower side thereof. The outer covering 33 further has a indentation 35 at one end thereof for matching the projecting portion 21 of the press handle 2. After assembly, the press handles 2 may utilize the respective pins 32 at the notches 22 thereof as pivots to control the links 31 of the elbow portions 3 to cause the outer jaw means 7 to move upwardly or downwardly via the mounting lugs 75.

Figure 5A:
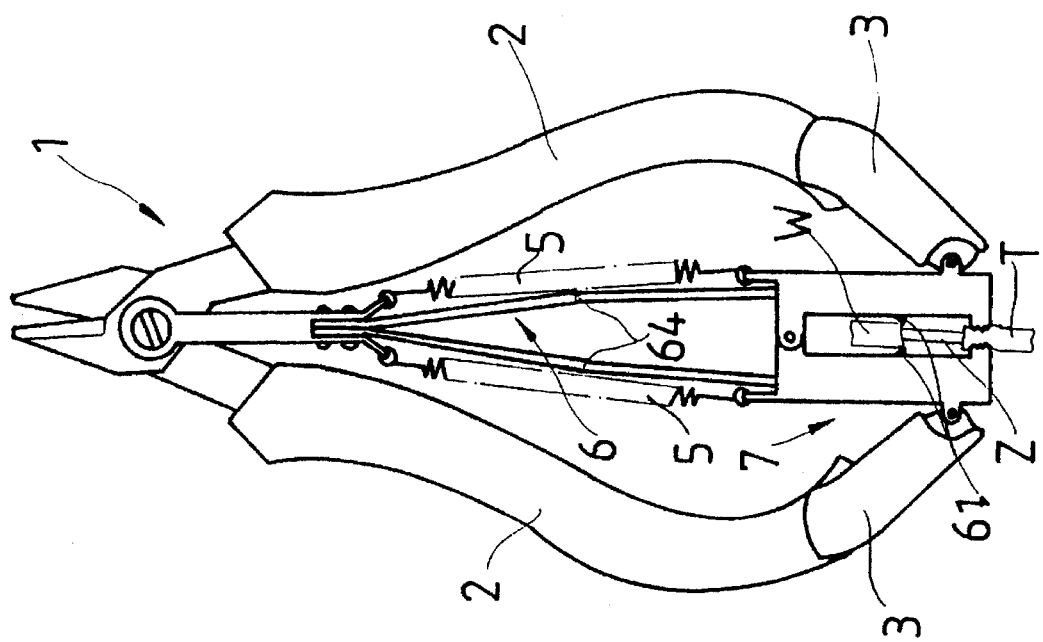
FIG. 5A is a schematic view illustrating the relationship between a pair of press handles and the elbow portions of the combination pliers of the present invention.
Figure 5B:
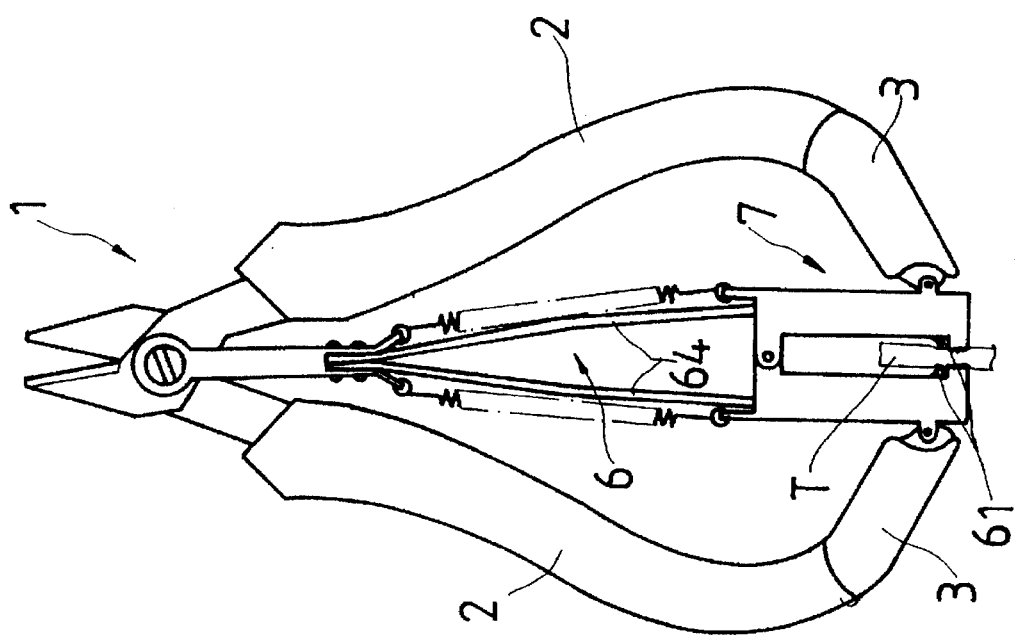
FIG. 5B is another schematic view illustrating the relationship between the pair of press handles and the elbow portions of the combination pliers of the present invention.
Figure 6A:
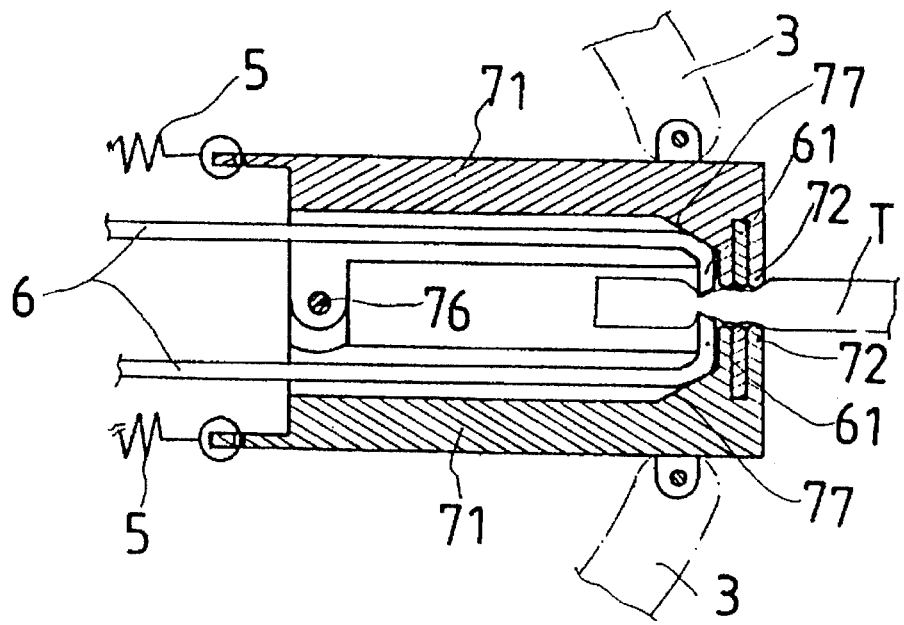
FIG. 6A is a schematic view illustrating action of an outer jaw means and an inner jaw means of the combination pliers of the present invention.
Figure 6B:
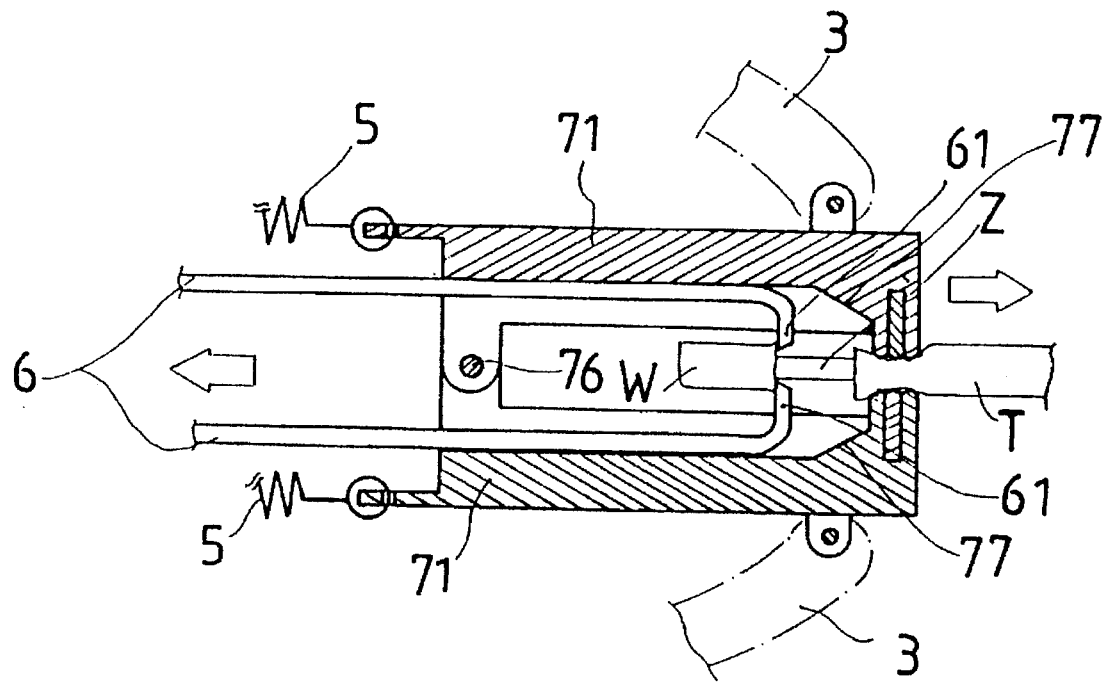
FIG. 6B is another schematic view illustration action of the outer jaw means and the inner jaw means of the combination pliers of the present invention.

In use, a wire T is placed within a clamping zone between the outer jaw means 7 and the inner jaw means 6. Referring to FIG. 5A, the press handles 2 are pressed downwardly so that the inner jaw means 6 and the outer jaw means 7 simultaneously clamp the wire T to an extent that the elbow portions 3 are forced to swing and bring the outer jaw means 7 to advance forwardly along the wire. Referring to FIG. 5B, as the pointer cutter 61 of the inner jaw means 6 is configured to have a sharpness capable of cutting into the skin W of the wire T but incapable of penetrating deeper into the wire to cut the wire filaments, when the outer jaw means 7 advances forwardly along and hence clamps the wire T, the pointer cutter 61 may strip the skin W off the wire T in a speedy manner. When the press handles 2 are released, the inner jaw means 6 resets to its original position as a result of the resilience of the strips 64, while the outer jaw means 7 is brought by the spring 5 to reset to its original position adjacent the inner jaw means 6. The elbow portions 3 also return to their original position.

reference to FIGS. 6A and 6B, which illustrate the state of the inner jaw means 6 and the outer jaw means 7 during the skinning operation. Referring to FIG. 6A, when the user exerts a force on the press handle mechanism, the inner jaw means 6 and the outer jaw means 7 simultaneously clamp the wire T, and the pointer cutter 61 of the inner jaw means 6 penetrates into the skin W of the wire T, and when the use continues to press the handle mechanism, the elbow portions swing so that the jaw portions 71 of the outer jaw means 7 advances radially along the wire T, while the inner jaw means 6 slidably displace towards the pivot portion along the inner sides of the jaw portions 71. Referring to FIG. 6B, due to the arrangement of the inclined surface 77 at the inner sides of the jaw portions 71 the pointer cutter 61 of the inner jaw means 6 gradually opens outwardly to a certain extent before displacing towards the pivot portion to strip the skin W off the wire T. When the pointer cutter 61 cuts the skin W and pulls it rearwardly, it is prevented from penetrating deeper into the wire T to damage the wire filaments since it is devised to open slightly outwardly.

In the present invention, wire cutting and wire skinning are simultaneously proceeded with in a same direction, which is very efficient as compared to the prior art in which it is necessary to cut into the skin of the wire before stripping the skin off. Besides, the cooperation between the outer jaw means and the inner jaw means and the configuration of the pointed cutter of the inner jaw means prevent damage to the wire filaments during wire skinning.

Although the present invention has been illustrated and described with reference to the preferred embodiment thereof, it should be understood that it is in no way limited to the details of such embodiment but is capable of numerous modifications within the scope of the appended claims.

What is claimed is:

1. A combination pliers structure, comprising:

a pliers body having a press handle mechanism consisting of two press handles pivotally connected by a pivot at one end thereof, each of said press handles forming a projecting portion at a rear end, said projection portion having a notch;

two elbow portions each of which is located at said notch of each of said press handles, each of said elbow portions consisting of a pair of links, a couple of pins, and an outer covering, each one of said pair of links being provided with a hole in either end thereof, said pins being used to join one end of said pair of links to said notch of one of said press handles, said outer covering having a first slot formed in an upper inner wall thereof and a second slot formed in a lower inner wall thereof, said first and second slots being shaped to match said links, said outer covering further having an indentation at one end thereof for receiving said projecting portion of one of said press handles such that when said elbow portions are located at the rear ends of said press handles, said press handles may utilize said pins in said notches as pivots to control displacement of said links;

a positioning lever pivotally connected with said pivot of said pliers body, a joint between said positioning lever and said pivot forming a fork-like structure, said positioning lever having one end extending to between said press handles of said pliers body and the other end forming a slot with an opening orienting towards the rear ends of said press handles;

an inner jaw means consisting of two elongate strips having their front ends secured in said slot of said positioning lever and their rear end portions opening outwardly to a suitable extent with their extreme ends bending inwardly to form face-to-face L-shaped portions, said L-shaped portions constituting a pointed cutter of a sharpness capable of penetrating into the wire skin but incapable of cutting the wire filaments;

an outer jaw means consisting of two jaw portions integrally formed from reinforced plastic material, each of said jaw portions having one end thereof forming a pivot portion with a lug, said lug forming a depressed portion with a hole at one side thereof, a tail portion with a hole being provided adjacent to said pivot portion, and the other end thereof forming a clamping portion provided with a groove, a metal sheet being inserted between said grooves of said clamping portions, each of said jaw portions having an inclined surface at an inner side thereof adjacent to said clamp portion such that said clamping portion decreases in thickness from said clamp portion to a certain extent before extending to said pivot portion, a mounting lug having a hole being disposed at an outer side of said clamping portion, said outer jaw means being located outside of said inner jaw means, two springs being provided such that one of said springs has one end thereof engaging said hole of said tail portion of one of said jaw portions and the other end thereof secured to said positioning lever, a pin being passed through said holes of said lugs of said jaw portions to pivotally connect said jaw portions together, said outer jaw means and said inner jaw means being pivotally connected by means of said positioning lever, and said pivot portions of said jaw portions being linked-up with said links of said elbows and and capable of swinging when said press handles are pressed.

* * * * *